United States Patent [19]
Guzy

[11] Patent Number: 5,274,940
[45] Date of Patent: Jan. 4, 1994

[54] PISTOL SUPPORT

[76] Inventor: Mark T. Guzy, 9675 Mapleton St., SE., East Canton, Ohio 44730

[21] Appl. No.: 924,624

[22] Filed: Aug. 3, 1992

[51] Int. Cl.$^5$ .............................................. F41A 23/06
[52] U.S. Cl. ........................................ 42/94; 89/37.04
[58] Field of Search ............................. 42/94; 89/37.04

[56] References Cited

U.S. PATENT DOCUMENTS

| | | | |
|---|---|---|---|
| 1,497,794 | 6/1924 | Saunders | 42/94 |
| 2,458,608 | 1/1949 | Lea | 89/37 |
| 3,200,528 | 8/1965 | Christensen | 42/94 |
| 3,345,027 | 10/1967 | Taylor | 248/187 |
| 3,648,396 | 3/1972 | Smith | 42/94 |
| 4,055,017 | 10/1977 | Thompson | 42/94 |
| 4,438,581 | 3/1984 | LaValle | 42/94 |
| 4,575,964 | 3/1986 | Griffin | 42/94 |
| 4,819,359 | 4/1989 | Bassett | 42/94 |
| 4,924,616 | 5/1990 | Bell | 42/94 |
| 5,058,305 | 10/1991 | Majesty | 42/94 |

Primary Examiner—David H. Brown
Attorney, Agent, or Firm—Michael Sand Co.

[57] ABSTRACT

A lightweight portable device for supporting a pistol in a stable shooting position on the ground or stationary object. A base has a smooth convex top surface which is slidably received in a concave recess formed in the bottom of a pistol butt supporting member for moving a top surface of the supporting member to a level position. The top surface is configured to match the contour of a bottom surface of a pistol butt to be seated thereon. An elastic strip movably secures the supporting member on the base. Removable inserts may be individually mounted on the supporting member each having a different configured top surface matching the bottom surface of a pistol to be used with the support enabling the device to be used with various pistols.

19 Claims, 4 Drawing Sheets

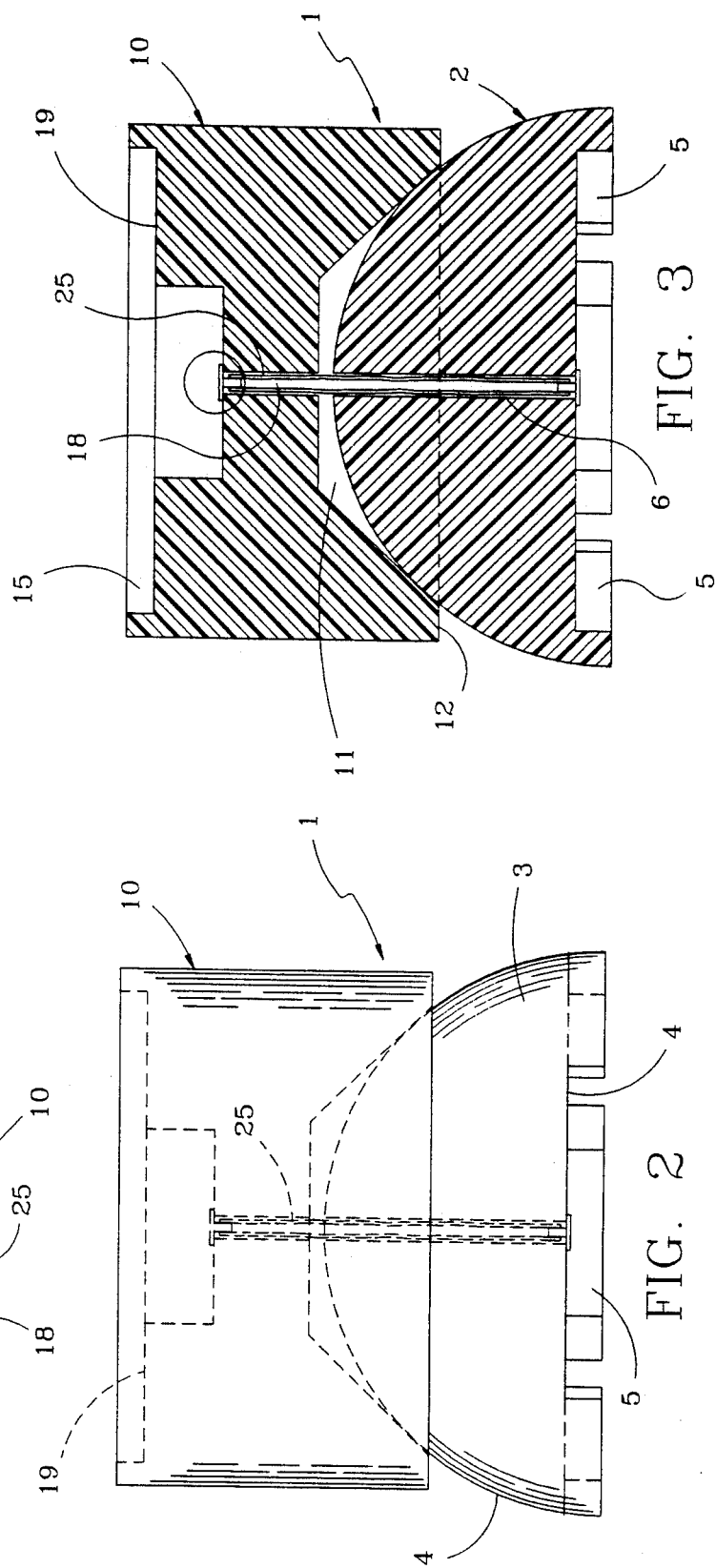

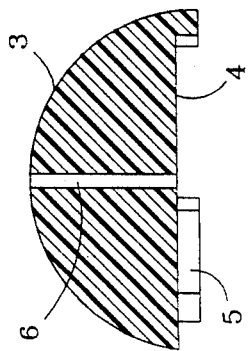
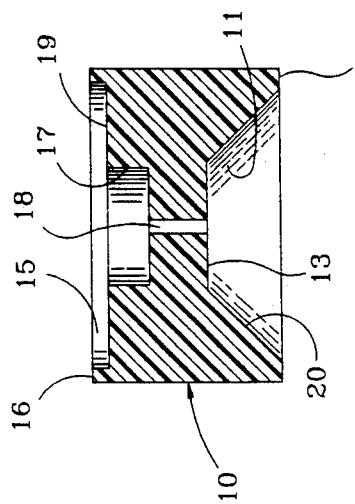
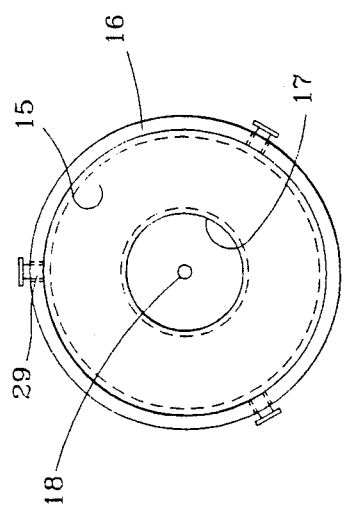
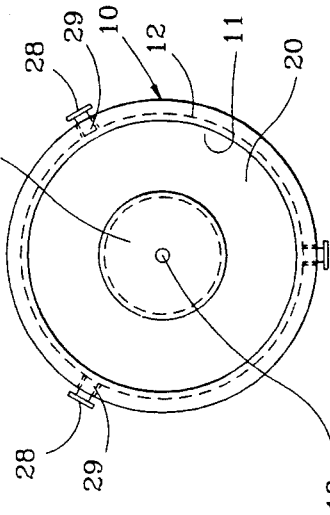
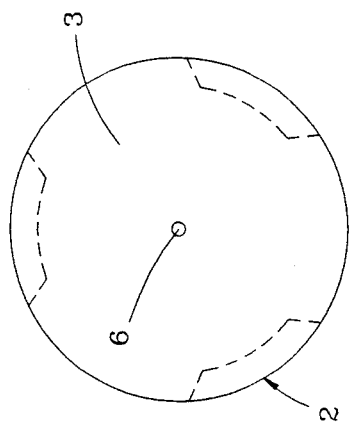
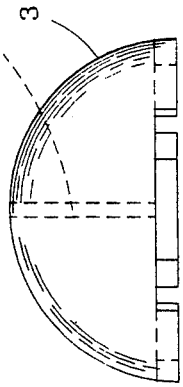
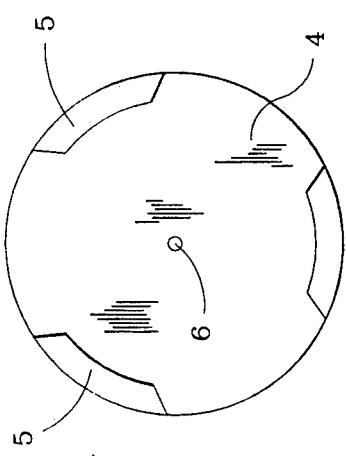

PISTOL SUPPORT

BACKGROUND OF THE INVENTION

1. Technical Field

The present invention relates to a device for pistols and more particularly to an improved pistol rest which provides a stable support for the pistol when in a shooting position. More particularly, the invention relates to such a pistol device which is portable and can be carried by a hunter or shooter into the field for supporting the pistol on the ground or a stationary object to provide a stable support surface.

2. Background Information

The use of pistols for both target shooting and hunting has grown considerably in recent years. However, one problem with the use of pistols is to provide a suitable rest when firing the pistol to increase the accuracy thereof. Most prior art pistol supports or steadying devices provide some means for supporting the barrel portion of the pistol or are attached to the pistol. Although these devices are satisfactory for target shooting applications, they are relatively bulky and expensive and are not suitable for use in the field such as when hunting. It is desirable that the hunter be able to support the pistol on a flat stationary object when in the field upon sighting game to provide for the best shooting results. However, in most situations upon sighting the game, such a support is not readily available and the hunter must attempt to steady the pistol entirely manually without any type of fixed support.

Therefore, the need exists for a pistol support which is extremely lightweight so the hunter can carry the device with him or her into the field and readily place the device on a surface such as a tree limb or stump, fence post or the like, or directly on the ground, immediately upon seeing the game. Furthermore, it is desirable that such a support is not physically attached to the pistol but the pistol is merely supported thereon.

There is no known pistol support of which I am aware which provides such objectives and advantages.

Examples of prior art pistol supports are shown in the following patents.

U.S. Pat. No. 2,458,608 discloses a pistol support in which the grip must be clamped within a supporting structure.

U.S. Pat. No. 3,200,528 discloses another pistol support which is attached to the body of the shooter and also is attached to the bottom of the pistol butt.

U.S. Pat. No. 3,345,027 discloses a stand in which the pistol is secured by its trigger guard to the stand and is intended for display purposes only.

U.S. Pat. No. 3,648,396 discloses a device for stabilizing a pistol in which the device engages the shooter's wrist, and includes a pair of spaced plates which are attached to the pistol grip after removal of the pistol grip hand plates.

U.S. Pat. No. 4,055,017 discloses an elaborate rest for a gun which provides both pivotal and rotational movement on the supporting base but is extremely bulk and cumbersome for carrying by a hunter into the field.

U.S. Pat. No. 4,438,581 discloses a device for supporting a pistol which includes a front tripod structure for supporting the barrel and a rearwardly sloping support which abuts a bottom surface of the pistol grip.

U.S. Pat. No. 4,819,359 discloses a pistol rest for stabilizing a pistol in which the pistol is clamped between a pair of front plates and has a rearwardly extending shelf on which the shooter's arm is supported.

None of the above patents describe any type of lightweight portable support which can be easily carried by the hunter and rapidly placed on a supporting surface in the field to provide a level secured shooting position.

SUMMARY OF THE INVENTION

Objectives of the invention include providing a lightweight portable device for securely supporting a pistol to enable the shooter to obtain increased accuracy regardless of the surrounding terrain in which the shooter is at the time a shot is desired.

Another objective is to provide such a device which is formed of a pair of lightweight components, preferably connected together by a flexible member to prevent separation and loss of the components and to facilitate its use, and in which the device can be carried easily in the pocket of the hunter and removed quickly and placed on the ground or surrounding support when the game or a target is sighted, with the pistol being pressed against a top surface of the device which is configured to match the bottom surface of the gun butt.

A still further objective of the invention is to provide such a device which includes a top member slidably movably mounted on a lower base member whereby the pistol, which is supported on the top member, can be moved easily to a level shooting position with the hunter exerting a downward force on the pistol grip to provide a firm steady grip on the pistol, to achieve an accurate shot.

Another objective of the invention is to provide such a device in which an additional support can be utilized such as a beverage can, on which the device is supported, to raise the elevation of the device when used in high grass without affecting the stable support provided by the device.

Another objective is to provide such a device in which the two members can be formed of a lightweight rust free plastic material, easily molded in mass quantities and assembled easily by a single flexible elastic strip of material.

Another objective of the invention is to provide such a device in which an insert having a contoured top surface configured to match the particular contoured surface of the bottom of the pistol butt can be removably mounted in a top recess of the device enabling the device to be adaptable to various pistols regardless of the configuration of the bottom surface of the pistol grip or butt.

A still further objective of the invention is to provide such a device which is lightweight, inexpensive and easy to use, and which can be used either in a target shooting environment or in the field when hunting.

These objectives and advantages are obtained by the improved pistol support of the invention, the general nature of which may be stated as a base having a bottom surface and a convex top surface, said base being adapted to be supported on the ground or stationary object when placing the pistol in a shooting position; a pistol butt supporting member having a top surface configured to match a bottom surface of a butt of a pistol to be supported thereon, and having a bottom surface formed with a recess generally complementary to the top surface of the base for slidably rotatably supporting the supporting member thereon; and a flexible member extending between the base and butt supporting member for movably connecting said base to said supporting member whereby said supporting member is slidably moved on the base to a desired shooting position with the pistol being supported in a stable shooting position on the supporting member.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 2 is a side elevational view of the pistol support of the invention shown in assembled position;

FIG. 3 is a longitudinal sectional view of the pistol support shown in FIG. 2;

FIG. 4 is an enlarged fragmentary view of the encircled portion of FIG. 3;

FIG. 5 is a side elevational view of the top butt supporting member of the pistol support;

FIG. 6 is a top plan view of FIG. 5;

FIG. 7 is a bottom plan view of FIG. 5;

FIG. 8 is a side elevational view of the base portion of the pistol support;

FIG. 9 is a top plan view of FIG. 8;

FIG. 10 is a bottom plan view of FIG. 8;

FIG. 11 is a longitudinal sectional view of the butt supporting member of FIG. 5;

FIG. 12 is a longitudinal sectional view of the base of FIG. 8;

Similar numerals refer to similar parts throughout the drawings.

DESCRIPTION OF THE PREFERRED EMBODIMENT

Figure 1:
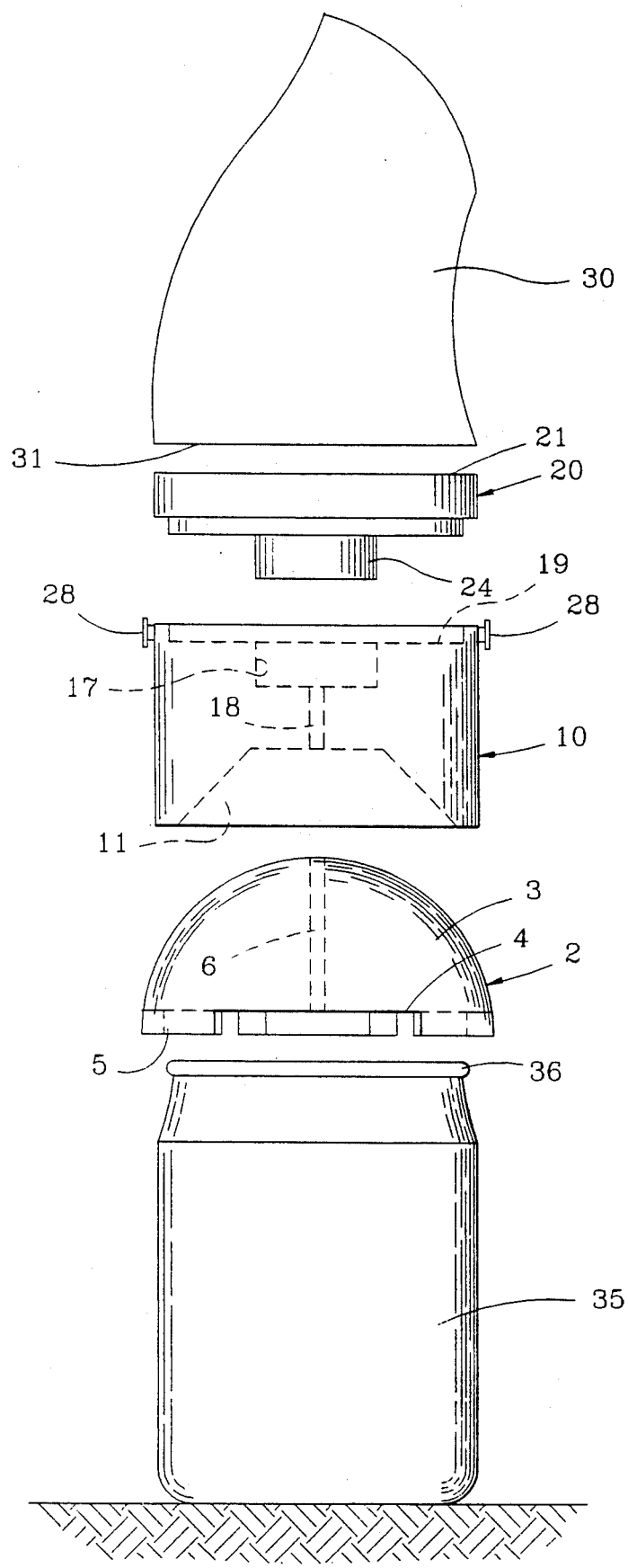
FIG. 1 is an exploded elevational view of the pistol support and a pistol grip to be supported thereby, in combination with an additional supporting member for raising the elevation of the support.
Figure 14:
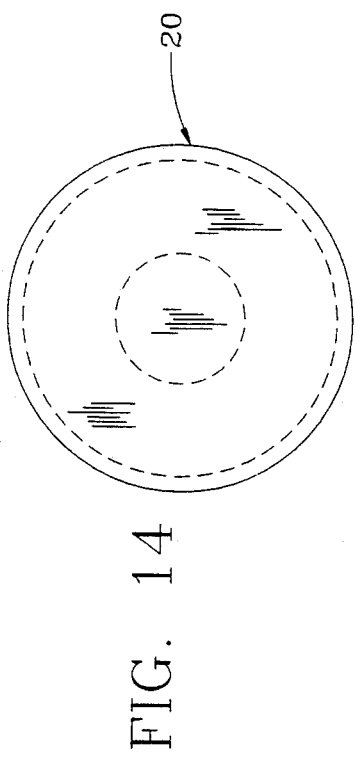
FIG. 14 is a top plan view of FIG. 13.
Figure 13:
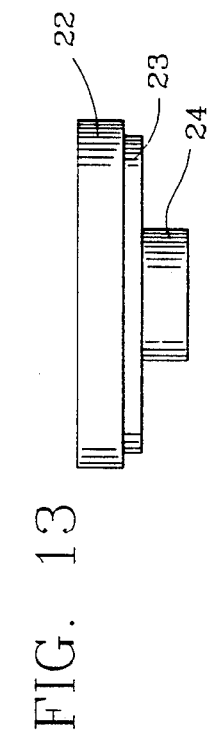
FIG. 13 is a side elevational view of one of the inserts of the pistol support.
Figure 15:
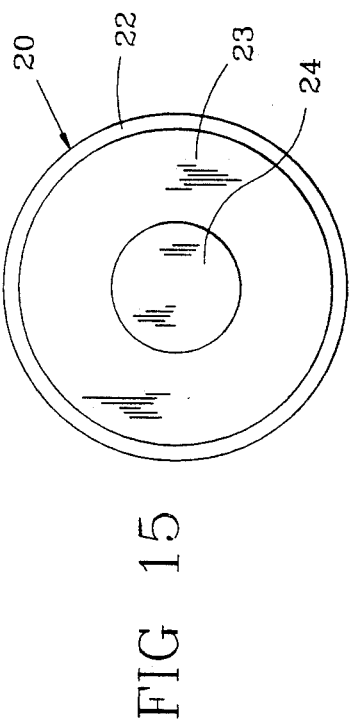
FIG. 15 is a bottom plan view of FIG. 13.
Figure 16:
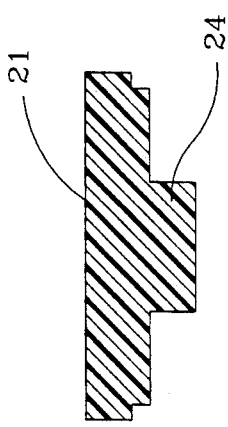
FIG. 16 is a longitudinal sectional view of FIG. 13.

The pistol support of the present invention is indicated generally at 1, and is shown in assembled position particularly in FIGS. 2 and 3. Support 1 includes two main components, a base indicated generally at 2, and shown in detail in FIGS. 8-10, and a butt supporting top member, indicated generally at 10, and shown in FIGS. 5-7 and 11.

Base 2 preferably is formed of a lightweight plastic material having a semispherical, dome-shaped configuration with a smooth convexly curved outer surface 3, and a recessed bottom surface 4, from which extends a plurality of support legs 5 downwardly therefrom. A vertically extending central hole 6 is formed in and extends completely through base 2.

Supporting member 10 preferably has a cylindrical shape, and preferably is formed of a lightweight plastic material similar to that of base 2. Support member 10 further includes a frusto-conical concave recess 11 formed in the center of its bottom surface 12. Recess 11 may be in the shape of a frustum as shown in the drawings, or could be smoothly curved to match the curvature of base 2. Recess 11 terminates in a generally flat upper surface 13. Butt supporting member 10 has a top surface 19 within an annular recess 15, which is formed by an annular top ledge 16. A smaller diameter cylindrical recess 17 is formed in recess 15 and communicates with bottom recess 11 by a vertically extending hole 18.

The conical sidewall 20 which forms recess 11 is adapted to engage the smooth convex outer surface 3 of base 2 when assembled therewith as shown particularly in FIGS. 2 and 3, to provide a smooth sliding, rotational movement therebetween. A pistol butt supporting insert indicated generally at 20, and shown particularly in FIGS. 13-16, is adapted to be mounted in recess 15 and has a generally cylindrical shape with a disc-shaped top surface 21 and a plurality of stepped cylindrical surfaces or portions 22, 23 and 24. Insert 20 is removably mounted in annular recess 15 formed in the top of butt supporting member 10, by a plurality of set screws 28 which extend through threaded holes 29, formed in annular top ledge 16. Set screws 28 engage the outer cylindrical surface of stepped portion 23 for removably mounting insert 20 therein.

A flexible member 25, which in the preferred embodiment is an elastic strip of material or rubberband, extends through aligned holes 6 and 18 and is secured therein by a termination clamp 26 best shown in FIGS. 3 and 4. Flexible member 25 has a sufficient length to slidably movably clamp support member 10 on curved surface 3 of base 2 permitting sliding rotational movement of member 10 thereon.

The manner of operation and use of support 1 is best illustrated in FIGS. 1, 2 and 3. A usual pistol, the handle portion 30 only being shown in FIG. 1, has a bottom butt surface 31 which is adapted to rest upon either top surface 19 of butt supporting member 10 when used without an insert 20, or in the alternative, rest upon top surface 21 of insert 20 when mounted within supporting member 10. Butt surface 31 for many pistols, will be a generally smooth flat surface and then will be used with pistol support without the use of an insert 20, since butt surface 31 will conform with and rest smoothly upon smooth top surface 19 of support member 10.

However, certain pistols will have a contoured bottom surface 31, depending upon its make and manufacture, which would not provide the desirable flat level engagement with top surface 19. In these situations, an insert 20 will be provided with its surface 21 having a contour complementary to the contour of gun butt surface 31. Thus the hunter will removably secure insert 20 in support member 10 by use of set screws 28, so that when the hunter rests the gun butt, and in particular surface 31 thereof, on insert surface 21 it will provide a complementary surface to provide a stable support for the pistol.

In use, a hunter or target shooter will carry support 1 in his or her coat pocket, either with or without an insert 20 being mounted therein, depending upon the particular pistol being used. The hunter then rests legs 5 of base 2 either directly on the ground, tree stump or the like, and will rest gun butt surface 31 directly on the supporting surface of member 10 or surface 21 of insert 20, and apply a steady downward pressure to form a stable support therebetween. By movement of the gun butt, member 10 will slide along smooth surface 3 of base 2 to the desired level shooting position, irrespective of the contour of the surface on which base legs 5 rest. Elastic strip 25 permits support member 10 to slide easily along curved surface 3 of base 2 until reaching the desired position, and will maintain base 2 and support member 10 always assembled ready for use, thereby preventing separation of the two components and possible loss thereof.

Should support 1 be used in tall grass or weeds, the hunter may provide an additional support for elevating the pistol support above the tall grass. One such supporting elevating device could be a usual beverage can 35 (FIG. 1), with its annular top rim 36 thereof being complementary to the bottom recess 4 of base 2 so as to be seated therein. The hunter can grasp the can with one hand to steady the can and pistol supports mounted thereon, with the other hand gripping pistol butt 30 while exerting the general downward force on support 1. Other types of elevating devices can be used such as a tripod or the like.

The stepped configuration of insert 20 enables it to align with and seat securely within recesses 15 and 17 of top supporting member 10 to firmly seat it therein. This would permit, if desired, the elimination of set screws 28, without affecting the concept of the invention. Insert 20 also may be formed of a lightweight rust free plastic material as is the preferred construction of base 2 and supporting member 10. An alternative construction would be to form insert 20 of a granular filled bag whereby the gun butt can be moved on top of such an insert with insert conforming to the particular shape of the bottom surface of the gun butt, providing a universal insert for support 1, instead of making a fixed top surface configuration to the insert in order to match the bottom surface of a particular gun butt.

Thus, the improved gun support of the invention improves accuracy to the shooter since the shooter puts a downward pressure on the pistol grip or butt which will hold it firmly in place thereby increasing accuracy and consistency by providing a secure support for the pistol regardless of the environment in which the shooter is in at the time a shot is desired. Furthermore, support 1 is an extremely lightweight, rust free construction, weighing several ounces. It is preferably formed of a lightweight plastic material, although wood or metal could be used if desired. In the preferred construction, support member 10 may have a height of approximately 1½ inches and have a diameter of approximately 2½ inches, with base 2 having a height of approximately 1½ inches with the maximum diameter near recess bottom surface 4, being approximately 3 inches. Thus, this provides such a compact, lightweight device which is easily transported by the hunter, yet which will provide a secure stable shooting position for the hunter and/or target shooter regardless of the surrounding terrain.

Accordingly, the pistol support is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pistol support is constructed and used, the characteristics of the construction, and the advantageous, new and useful results obtained; the new and useful structures, devices, elements, arrangements, parts and combinations, are set forth in the appended claims.

I claim:

1. A portable device for supporting a pistol butt in a stable shooting position including:
   a) a base having a bottom surface and a generally convex top surface, said base being adapted to be supported on the ground or stationary object when placing a pistol butt in a shooting position;
   b) a supporting member having a top surface configured to match a bottom surface of a butt of a pistol to be supported thereon, and having a bottom surface formed with a recess generally complementary to the top surface of the base, for slidably mounting the supporting member thereon; and
   c) a flexible member extending between and centrally connected to the base and butt supporting member for movably connecting said base to said supporting member whereby said supporting member is slidably movable on the base to a desired shooting position with the pistol butt being supported in a stable shooting position on the top surface of the supporting member.

2. The pistol supporting device defined in claim 1 in which insert means is removably mounted on the butt supporting member for providing a top surface configured to match a bottom surface of a pistol butt.

3. The pistol supporting device defined in claim 2 in which the butt supporting member is formed with an annular top recess; and in which the insert means is disc-shaped and is removably seated in said annular top recess.

4. The pistol supporting device defined in claim 3 including means for removably securing the insert means in the annular top recess.

5. The pistol supporting device defined in claim 4 in which the securing means is a plurality of set screws.

6. The pistol supporting device defined in claim 3 in which the insert means has a top surface which forms the top surface of the supporting member configured to match the bottom surface of a pistol supported thereon.

7. The pistol supporting device defined in claim 1 in which the bottom recess of the supporting member is in the shape of a frustum.

8. The pistol supporting device defined in claim 1 in which a bottom recess is formed in the base; and in which elevation means is removably inserted into said bottom recess for elevating the height of the butt supporting surface.

9. The pistol supporting device defined in claim 8 in which the elevating means is a beverage can.

10. The pistol supporting device defined in claim 1 in which the flexible member is an elastic cord.

11. The pistol supporting device defined in claim 1 in which the base has a generally dome-shaped configuration.

12. The pistol supporting device defined in claim 3 in which the insert means has a stepped bottom surface; and in which the annular top recess of the supporting member has a stepped configuration generally complementary to the stepped bottom surface of the insert means.

13. The pistol supporting device defined in claim 1 in which a vertically extending hole is formed through the center of the base and aligns with a vertically extending hole formed in the butt supporting member; and in which the flexible member is a strip of elastic material which is attached to the base and butt supporting member and extends through the pair of aligned holes.

14. The pistol supporting device defined in claim 1 in which the base has a plurality of downwardly extending legs for supporting the base on the ground or stationary object.

15. In combination, a pistol butt and a portable device for supporting the pistol butt in a stable shooting position including:
  a) base means for supporting the device on a surface;
  b) a pistol butt supporting member movably mounted on the base means and having a support surface for supporting a bottom surface of a butt of the piston thereon;
  c) means movably mounting the butt supporting member on the base means; and
  d) insert means removably mounted on the butt supporting member and having a top surface generally configured to match the contour of the bottom surface of a pistol butt for forming the said support surface of said supporting member.

16. The combination defined in claim 15 in which the base means and butt supporting member are formed of a plastic material.

17. In combination, a pistol butt and a portable device for supporting the pistol butt in a stable shooting position including:
  a) base means for supporting the device on a surface;
  b) a pistol butt supporting member movably mounted on the base means and having a support surface for supporting a bottom surface of a butt of the pistol thereon; and
  c) means movably mounting the butt supporting member on the base means including an elastic member extending between and attached to said base means and the butt supporting member.

18. In combination, a pistol butt and a portable device for supporting the pistol butt in a stable shooting position including:
  a) base means for supporting the device on a surface, said base means having a convex upper surface;
  b) a pistol butt supporting member movably mounted on the base means and having a support surface for supporting a bottom surface of a butt of the pistol thereon; and
  c) means movably mounting the butt supporting member on the base means including a concave bottom surface formed on the pistol butt supporting member slidably engaged with the convex upper surface of the base means for movably mounting said supporting member on the base means.

19. In combination, a pistol and a portable device for supporting the pistol in a stable shooting position including:
  a) semispherical shaped base means for supporting the device on a surface;
  b) a generally cylindrical shaped pistol butt supporting member movably mounted on the base means and having support surface for supporting a bottom surface of a butt of the pistol thereon; and
  c) means movably mounting the butt supporting member on the base means.

* * * * *